US012784179B2

(12) United States Patent
Alfassi et al.

(10) Patent No.: US 12,784,179 B2
(45) Date of Patent: Nov. 3, 2026

(54) UNSUPERVISED METHOD TO INCREASE SIGNAL-TO-NOISE-RATIO OF DEFECTS IN AN INSPECTION SYSTEM

(71) Applicant: Applied Materials Israel Ltd., Rehovot (IL)

(72) Inventors: Yuval Alfassi, Rehovot (IL); Boris Sherman, Rehovot (IL); Marcelo Bacher, Givatayim (IL); Ortal Yesodi, Modiin-Maccabim-Reut (IL)

(73) Assignee: Applied Materials Israel Ltd., Rehovot (IL)

( * ) Notice: Subject to any disclaimer, the term of this patent is extended or adjusted under 35 U.S.C. 154(b) by 265 days.

(21) Appl. No.: 18/584,963

(22) Filed: Feb. 22, 2024

(65) Prior Publication Data

US 2025/0272824 A1 Aug. 28, 2025

(51) Int. Cl.

| | |
|---|---|
| ***G06T 7/00*** | (2017.01) |
| ***G06T 5/50*** | (2006.01) |
| ***G06T 5/70*** | (2024.01) |

(52) U.S. Cl.

CPC ................ *G06T 7/001* (2013.01); *G06T 5/50* (2013.01); *G06T 5/70* (2024.01); *G06T 2207/20221* (2013.01); *G06T 2207/20224* (2013.01); *G06T 2207/30148* (2013.01)

(58) Field of Classification Search

CPC .. G06T 7/001; G06T 5/50; G06T 5/70; G06T 2207/20221; G06T 2207/20224; G06T 2207/30148

USPC .......................................................... 382/100

See application file for complete search history.

(56) References Cited

U.S. PATENT DOCUMENTS

| | | | | |
|---|---|---|---|---|
| 9,778,206 | B2 * | 10/2017 | Honda | G01N 21/956 |
| 2020/0244963 | A1 * | 7/2020 | Patwary | G06T 7/001 |
| 2024/0037891 | A1 * | 2/2024 | Kazumi | G06T 3/02 |

FOREIGN PATENT DOCUMENTS

| | | | | |
|---|---|---|---|---|
| CN | 114936267 A * | 8/2022 | | G06N 3/044 |
| EP | 4184250 A1 | 5/2023 | | |

* cited by examiner

*Primary Examiner* — Jennifer Mehmood
*Assistant Examiner* — Pardis Sohraby
(74) *Attorney, Agent, or Firm* — Lowenstein Sandler LLP

(57) ABSTRACT

A method for increasing Signal-to-Noise-Ratio (SNR) of defect detection in inspection of wafers or masks, the method including receiving a current image, receiving a reference image, receiving an indication for existence of a defect in the current image, producing a difference image between the current image and the reference image, performing singular value decomposition (SVD) on the difference image, removing one or more lower-valued singular values from a diagonal middle matrix produced by the SVD, thereby producing a reduced middle matrix, and producing an improved-SNR difference image by reconstructing the difference image using the reduced middle matrix. Related apparatus and methods are also described.

8 Claims, 7 Drawing Sheets

DIFF IMAGE $$\overset{U}{\begin{pmatrix} u_{11} & \cdots & u_{1n} \\ \vdots & \ddots & \vdots \\ u_{n1} & \cdots & u_{nn} \end{pmatrix}} \cdot \overset{S}{\begin{pmatrix} s_1 & \cdots & 0 \\ \vdots & \ddots & \vdots \\ 0 & \cdots & s_n \end{pmatrix}} \cdot \overset{V^*}{\begin{pmatrix} v_{11} & \cdots & v_{1n} \\ \vdots & \ddots & \vdots \\ v_{n1} & \cdots & v_{nn} \end{pmatrix}}$$

FIG. 2A

RECONSTRUCTED-DIFF IMAGE $$\overset{U}{\begin{pmatrix} u_{11} & \cdots & u_{1n} \\ \vdots & \ddots & \vdots \\ u_{n1} & \cdots & u_{nn} \end{pmatrix}} \cdot \overset{S'}{\begin{pmatrix} s_1 & 0 & 0 & & 0 \\ 0 & s_2 & 0 & \cdots & 0 \\ 0 & 0 & 0 & & 0 \\ & \vdots & & \ddots & \vdots \\ 0 & 0 & 0 & \cdots & 0 \end{pmatrix}} \cdot \overset{V^*}{\begin{pmatrix} v_{11} & \cdots & v_{1n} \\ \vdots & \ddots & \vdots \\ v_{n1} & \cdots & v_{nn} \end{pmatrix}}$$

FIG. 2B

UNSUPERVISED METHOD TO INCREASE SIGNAL-TO-NOISE-RATIO OF DEFECTS IN AN INSPECTION SYSTEM

TECHNOLOGICAL FIELD

The present disclosure, in some embodiments thereof, relates to an image processing method for wafer or mask inspection and, more particularly, but not exclusively, to a method for increasing Signal-to-Noise-Ratio (SNR) of a suspected defect in an image produced by wafer or mask inspection.

BACKGROUND

US Patent Application Publication 2020/0244963 of Patwary et al apparently describes a sample characterization system. In embodiments, the sample characterization system includes a controller communicatively coupled to an inspection sub-system, the controller including one or more processors configured to execute a set of program instructions stored in memory, the set of program instructions configured to cause the one or more processors to: acquire one or more target image frames of a sample; generate a target tensor with the one or more acquired target image frames; perform a first set of one or more decomposition processes on the target tensor to form generate one or more reference tensors including one or more reference image frames; identify one or more differences between the one or more target image frames and the one or more reference image frames; and determine one or more characteristics of the sample based on the one or more identified differences.

EPO Patent Application Publication 4 184 250 A1 of ASML Netherlands B.V. apparently describes a measurement process is performed for each of a plurality of locations on a product of a fabrication process at which a parameter of interest characterizing the fabrication process is believed to be the same, to derive measured signals for each location including at least one image. A dimensional reduction method is applied to a dataset of the measured signals, to obtain components of the dataset, including components indicative of variation between the images. For at least one of these components, one or more associated ones of the measured signals are identified, comprising at least one set of corresponding pixels in the respective images for the plurality of locations. The contribution of the identified measured signals in the dataset is reduced or eliminated to obtain a filtered signal, and the parameter of interest is obtained from the filtered signal.

BRIEF DESCRIPTION OF THE DRAWING(S)

Some embodiments of the disclosure are herein described, by way of example only, with reference to the accompanying drawings and images. With specific reference now to the drawings and images in detail, it is stressed that the particulars shown are by way of example and for purposes of illustrative discussion of embodiments of the disclosure. In this regard, the description taken with the drawings and images makes apparent to those skilled in the art how embodiments of the disclosure may be practiced.

In the drawings:

FIG. 2A is a simplified illustration of SVD of a Diff image according to an example;

FIG. 2B is a simplified illustration of a Reconstructed-Diff image according to an example;

Figure 3A:
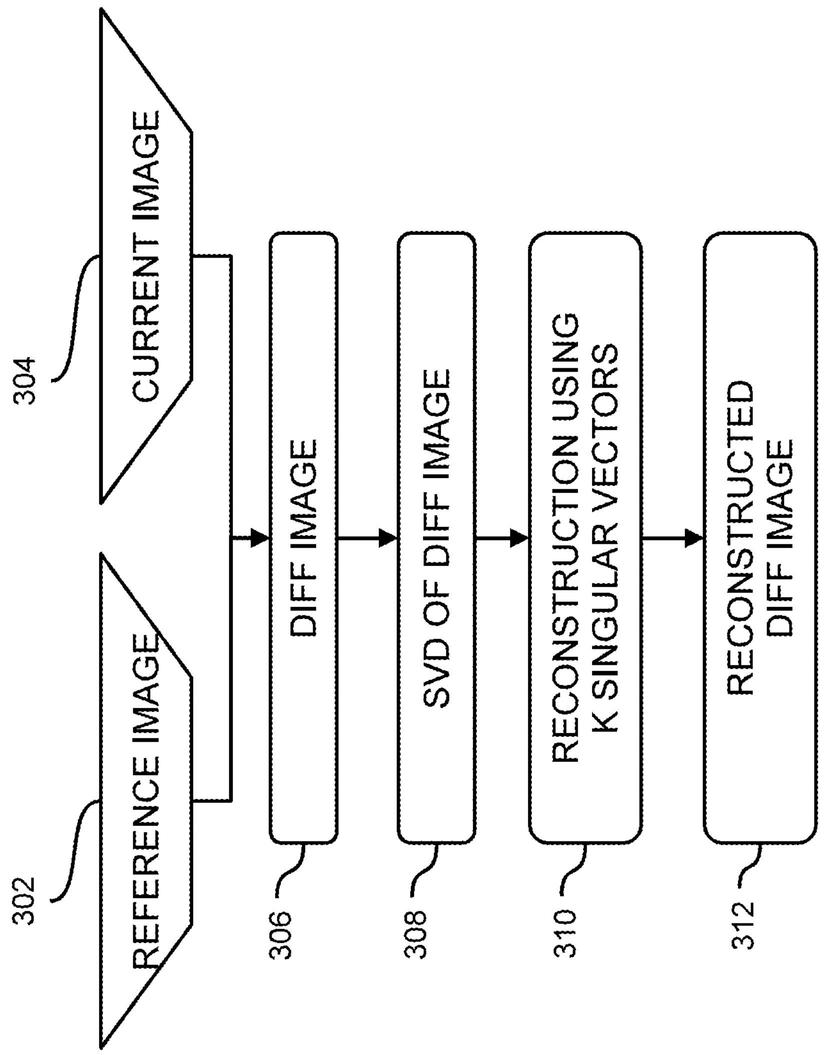
FIG. 3A is a simplified flow chart illustration of a method for increasing Signal-to-Noise-Ratio (SNR) of a suspected defect in an image produced by wafer or mask inspection according to an example.
Figure 3B:
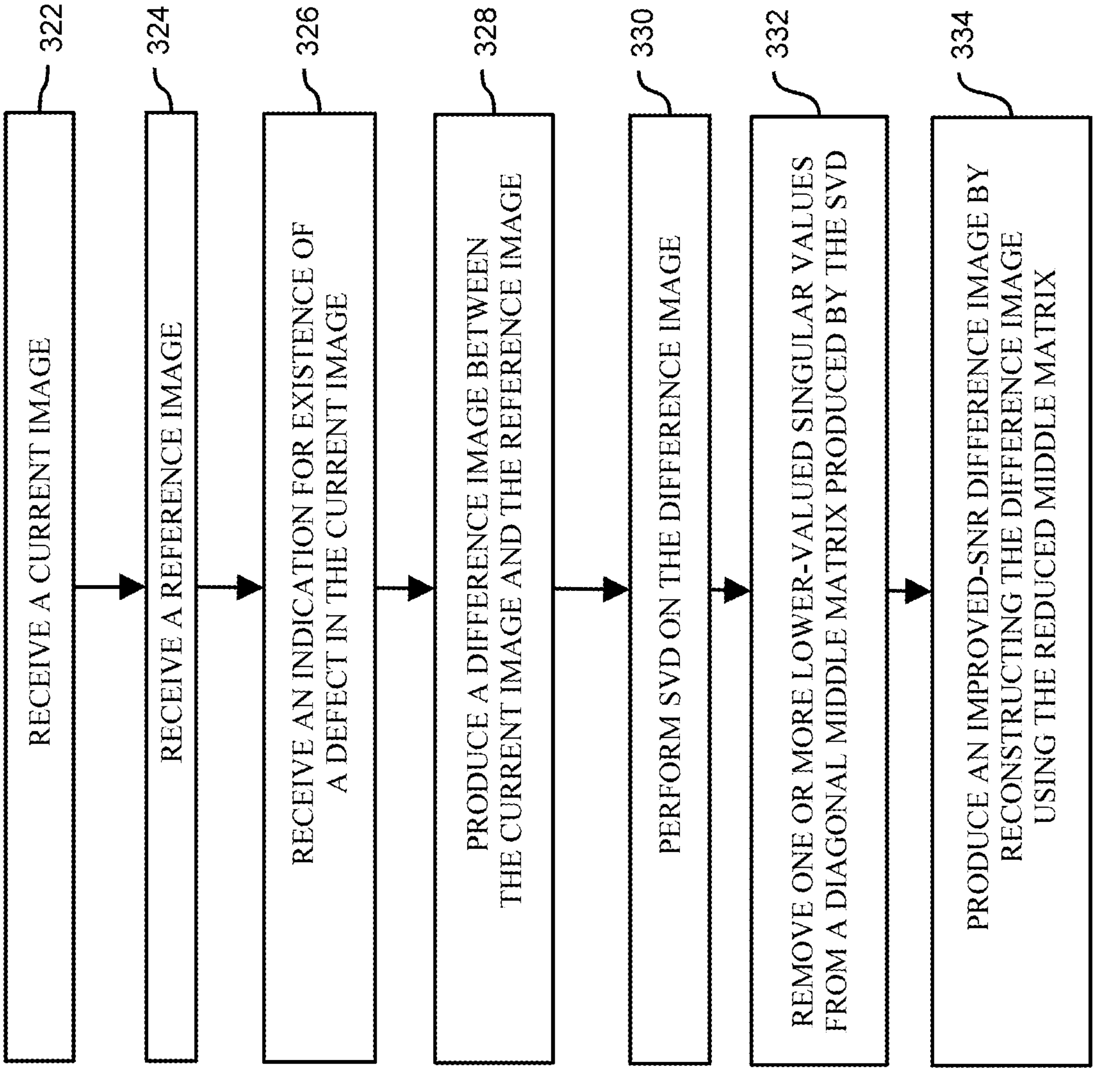
Figure 3C:
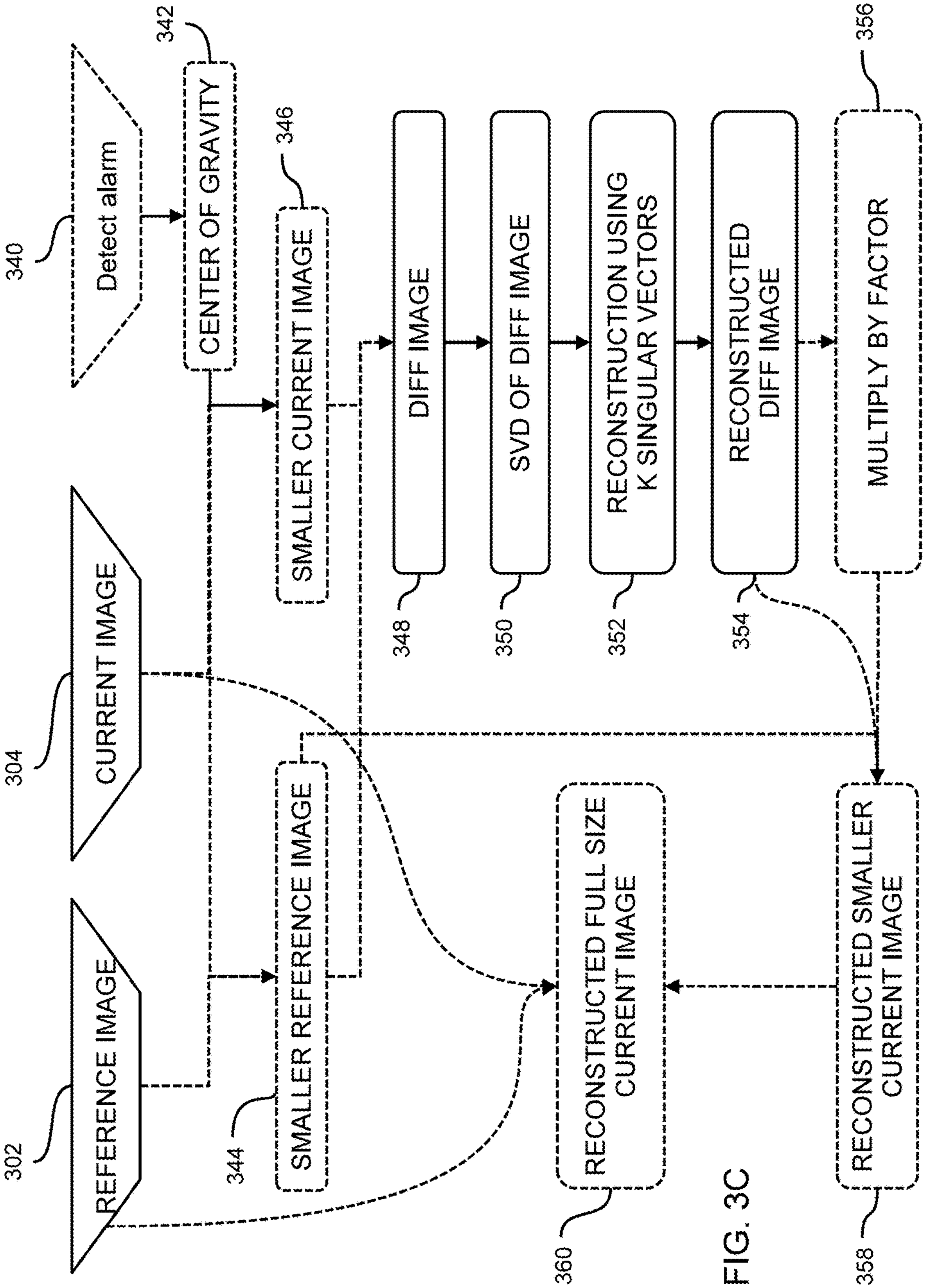
Figures 4A, 4B:
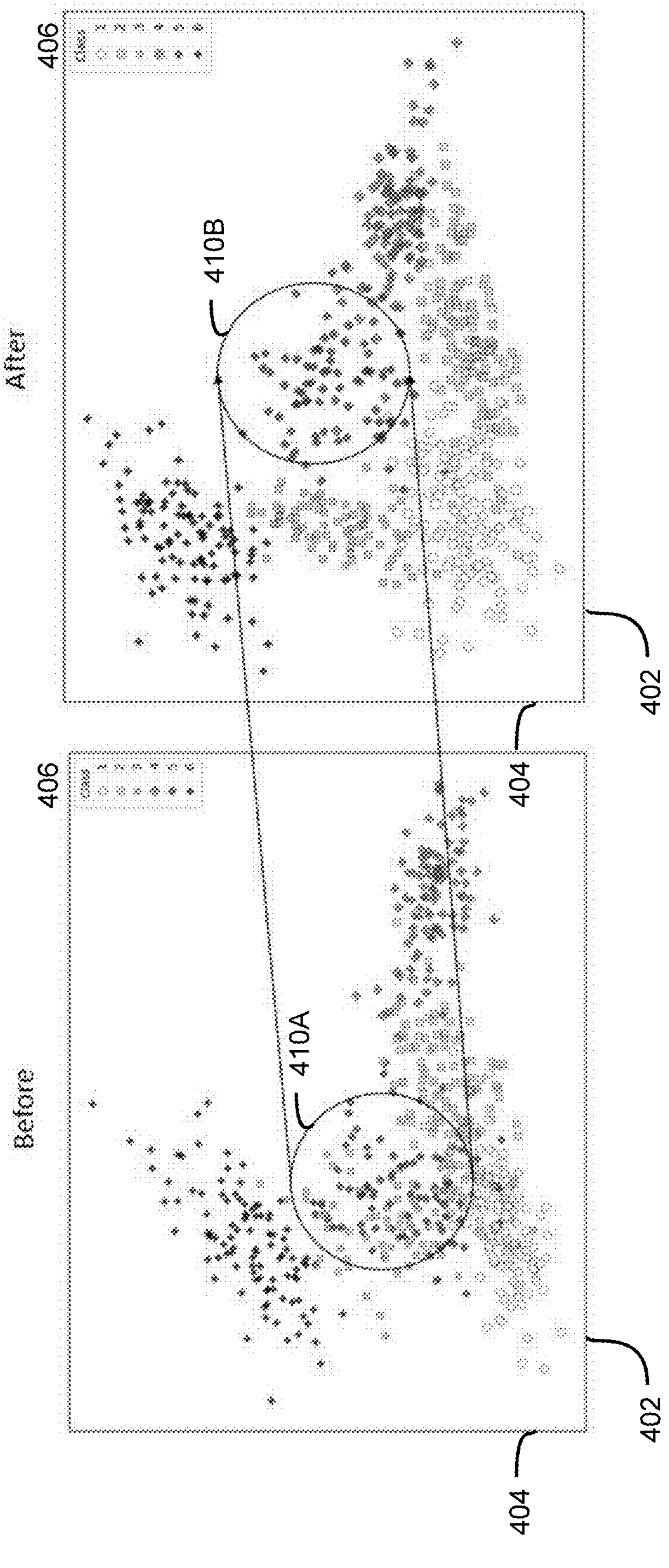
Figure 5A:
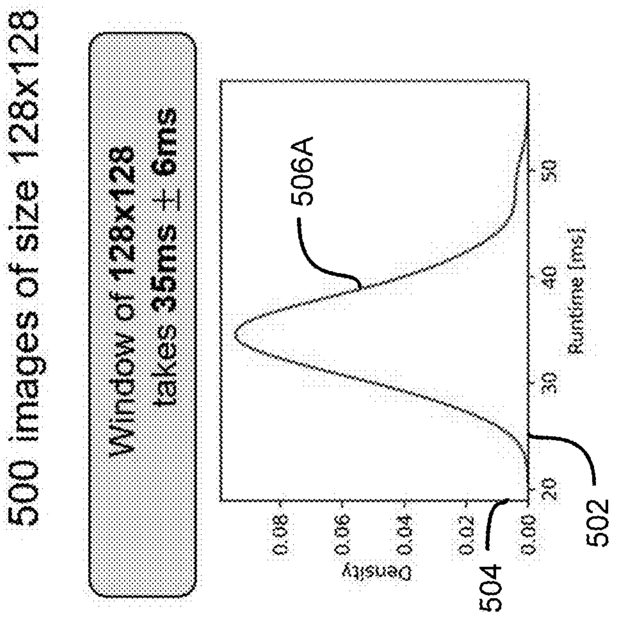
Figure 5B:
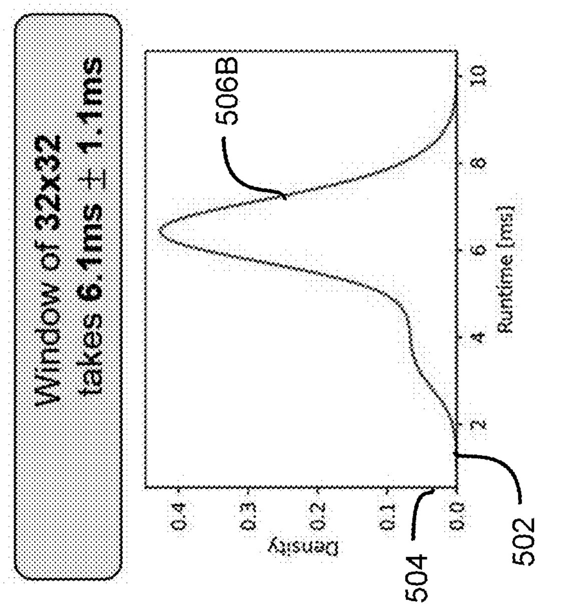

3B is a simplified flow chart illustration of a method for increasing Signal-to-Noise-Ratio (SNR) of defect detection in inspection of wafers or masks according to an example;

FIG. 3C is a simplified flow chart illustration of a method for increasing Signal-to-Noise-Ratio (SNR) of a suspected defect in an image produced by wafer or mask inspection according to an example;

FIGS. 4A and 4B are illustrative examples of scatter plots of a population of defects in two-dimensions based on two qualitative parameter values of the defects along two axes according to an example; and FIGS. 5A and 5B are graphs of duration for producing an improved SNR image according to an example.

DETAILED DESCRIPTION OF EXAMPLES

The present disclosure, in some embodiments thereof, relates to an image processing method for wafer or mask inspection and, more particularly, but not exclusively, to a method for increasing Signal-to-Noise-Ratio (SNR) of a suspected defect in an image produced by wafer or mask inspection.

Introduction

A wafer or mask inspection system may operate at human-visible wavelengths or at electron beam wavelength. The inspection system produces images obtained of a wafer or a mask under inspection, termed a current image.

Current, Reference and Difference Images

In some examples, the current image is compared to a reference image of a same or similar area of a reference wafer or mask.

It is noted that the comparison is made of a reference image and a current image which are registered to each other.

The reference image may optionally be one of the following: an image of another wafer or mask of the same product, an image of an area in a same wafer or mask which is supposed to appear the same, a synthetically computed reference image, and any one of the above images which has gone through some preprocessing.

Where there are differences between the current image and the reference image, an alarm or suspicion is produced, that a defect may be present in the current image of the wafer or the mask under inspection.

The defects may be very small, in a sense of taking up few pixels in an image, and hard to detect, in a sense of having low SNR relative to an image in which they appear, and it is sometimes desirable to improve an image of the defect.

Generally, a reference image is produced of a reference mask or wafer, whether by imaging or by synthetically generating, and optionally may be preprocessed, and the reference image includes:

$$\text{Reference Image}=\text{Pattern}+(\text{Process Variation})_1+\text{Noise}_1$$

where the Pattern is an example pattern, which may or may not be a clean, desired pattern, however the process for producing the reference image inherently produces artifacts which include (Process Variation) 1 of the production of the reference image, and $Noise_1$ related to the specific reference image which is produced.

It is noted that Process Variation may cause the Reference Image to be different than a specific pattern is meant to be, and Noise may cause additional variations in the Reference image.

A current image which includes a Defect is produced of the mask or wafer under inspection, and the current image includes:

$$\text{Current Image}=\text{Pattern}+\text{Defect}+(\text{Process Variation})_2+\text{Noise}_2$$

where the Pattern is a current pattern, plus a suspected Defect, plus artifacts which include, similarly to the artifacts of the Reference Image, $(\text{Process Variation})_2$ of the production of the current image, and $Noise_2$ related to the specific current image which is produced.

When there is a suspected defect in a current image, and sometimes in the process of searching for suspected defects, the current image is digitally subtracted from the reference image, producing a difference image, also termed a Diff image.

The Diff image, based on the mathematical operation of subtraction of the Reference image from the Current Image, or of the Current Image from the Reference Image, includes:

$$\text{Diff Image}=\text{Defect}+(\text{Process Variation})_3+\text{Noise}_3$$

where the Defect is an image of the defect, if such is present in the current image, plus artifacts which include $(\text{Process Variation})_3$ of subtraction of the reference image from the current image, which may be different from either one of (Process Variation) 1 and $(\text{Process Variation})_2$, and Noise 3, which may be different from either one of Noise and $Noise_2$.

The Diff image should show the Defect clear of background, however, the Diff image includes Process Variation and Noise.

Figure 1A:
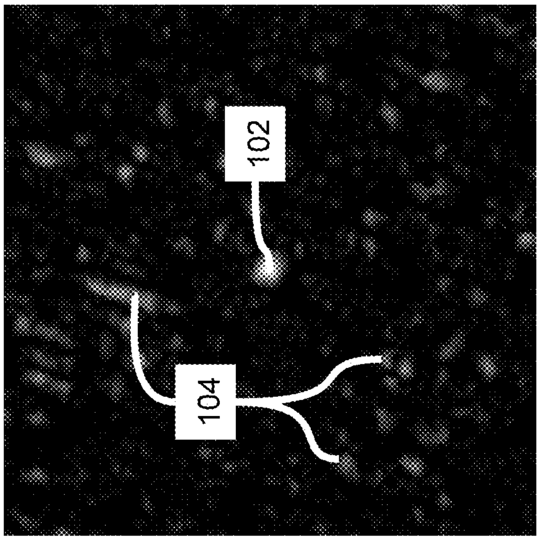
FIG. 1A is a Diff image according to an example.

Reference is now made to FIG. 1A, which is a Diff image according to an example.

FIG. 1A shows a suspected defect 102 and noise, some examples of which are pointed out by reference 104.

Figure 1B:
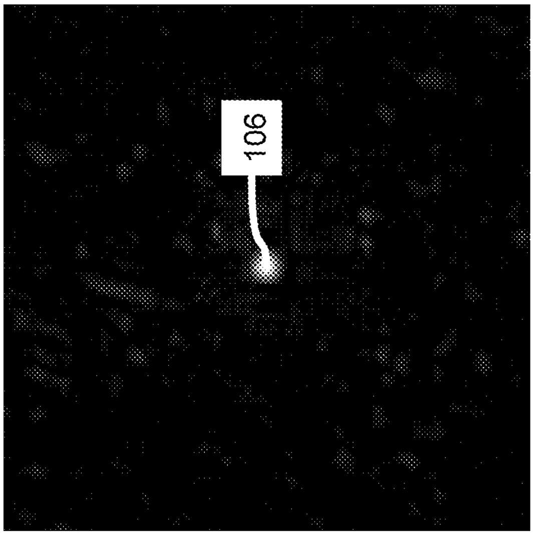
FIG. 1B is a Diff image following a process for increasing Signal-to-Noise-Ratio (SNR) according to an example.

Reference is now made to FIG. 1B, which is a Diff image following a process for increasing Signal-to-Noise-Ratio (SNR) according to an example.

FIG. 1B shows the Diff image of FIG. 1A image following a process for increasing SNR, shows that noise has been mostly removed.

Singular Value Decomposition (SVD)

A singular value decomposition (SVD) is a factorization of a matrix into a rotation, followed by a rescaling followed by another rotation. The images discussed herein are digital images, therefore matrices. The SVD generalizes the eigendecomposition of a square normal matrix with an orthonormal eigen-basis to any m×n matrix.

The SVD of an mxn complex matrix M is a factorization of the form M=USV*, where U is an mxm complex unitary matrix, S is an mxn rectangular diagonal matrix with non-negative real numbers on the diagonal, V is an nxn complex unitary matrix, and V* is the conjugate transpose of V.

The SVD is not unique. It is always possible to choose the decomposition so that the singular values Si are in descending order. In this case, S (but not U and V) is uniquely determined by M.

Using SVD to Increase SNR in a Diff Image

A method for increasing SNR of a defect in a Diff image includes performing SVD on the Diff image, removing, or zeroing, all but k highest values in the matrix S, producing a matrix S', and reconstructing a Reconstructed-Diff image using US'V*.

The Reconstructed-Diff image typically shows a defect with a greater SNR between the defect and the noise.

Reference is now made to FIG. 2A, which is a simplified illustration of SVD of a Diff image according to an example.

FIG. 2A shows SVD of a Diff image into matrices U, S and V*, where S is a matrix with singular values Si along a diagonal of the matrix S are in descending order.

Reference is now made to FIG. 2B, which is a simplified illustration of a Reconstructed-Diff image according to an example.

FIG. 2B shows SVD of an Reconstructed Diff image, where U and V* are the matrices U and V* of FIG. 2A, and S' is the matrix S of FIG. 2A with singular values Si along a diagonal of the matrix S are in descending order. FIG. 2B shows highest values $S_1$ and $S_2$ have been kept from matrix S of FIG. 2A, and other lower values Si have been given a value of zero.

Example Variations on Using SVD to Increase SNR in a Diff Image

In some examples, the Reconstructed-Diff image may be multiplied by a factor, optionally a factor greater than one, in order to further emphasize the defect in the Reconstructed-Diff image.

In some examples, the Reconstructed-Diff image may be added to a reference image, thereby producing an image where the defect is emphasized.

In some examples, when receiving a location of a suspect defect in an image, a window around the location of the suspect defect is taken, the window being within the reference image and the current image, yet smaller than the reference image and the current image, so that the Diff image is also smaller. Such a choice potentially enables performing SVD faster, in a shorter time. Furthermore, the SVD focuses on an area containing the defect, and values of the middle matrix of the SVD operation will include more of the defect and less of the background, and removing some elements from the middle matrix of the SVD operation will improve SNR of the defect within the smaller window more than when the window is bigger. The size of the reference and current images may be determined based on various inspection system parameters, yet the size of the Diff image on which SVD is to be performed may optionally be made different, optionally smaller, to speed up calculation and/or lower the calculation load. It is noted that for an image of dimension N×N, the complexity of performing SVD is $O(N^3)$, and reducing a size of an image significantly reduces the complexity and/or time of the calculation.

Reference is now made to FIG. 3A, which is a simplified flow chart illustration of a method for increasing Signal-to-Noise-Ratio (SNR) of a suspected defect in an image produced by wafer or mask inspection according to an example.

FIG. 3A shows input of a reference image 302 and a current image 304.

A Diff image 306 is produced by subtracting one of the reference image 302 and the current image 304 from the other. By way of a non-limiting example the Diff image (306) is defined as the current image 304 minus the reference image 302, and later on a Reconstructed-Diff image (312) (see below) is added to the reference image (302), one may optionally obtain a reconstructed current image. By way of another non-limiting example the Diff image (306) is defined as an absolute of subtracting one of the reference image 302 and the current image 304 from the other.

The Diff image has SVD performed upon it (308), as described above, producing three matrices USV*, where S is an mxn rectangular diagonal matrix with non-negative real numbers on the diagonal, termed singular values Si, and zero elsewhere, and singular values Si of the diagonal of S are in descending order.

A Reconstructed-Diff image (312) is reconstructed (310) from US'V", where S' is the matrix S where k higher valued diagonal term Si are kept, and the rest are made zero.

Reference is now made to FIG. 3B, which is a simplified flow chart illustration of a method for increasing Signal-to-Noise-Ratio (SNR) of defect detection in inspection of wafers or masks according to an example.

The method of FIG. 3B includes:

receiving a current image (322);

receiving a reference image (324);

receiving an indication for existence of a defect in the current image (326);

producing a difference image between the current image and the reference image (328). The difference image may optionally be calculated as described above with reference to FIG. 3A;

performing singular value decomposition (SVD) on the difference image (330);

removing one or more lower-valued singular values from a diagonal middle matrix produced by the SVD (332), thereby producing a reduced middle matrix; and producing an improved-SNR difference image by reconstructing the difference image using the reduced middle matrix (334).

Reference is now made to FIG. 3C, which is a simplified flow chart illustration of a method for increasing Signal-to-Noise-Ratio (SNR) of a suspected defect in an image produced by wafer or mask inspection according to an example.

FIG. 3C is based on the method shown by FIG. 3A and shows various additional optional improvements to the method of FIG. 3A. It is noted that jut some of the various optional improvements may be implemented, as not all the optional improvements depend on each other.

FIG. 3C shows input of a reference image 302 and a current image 304, and an optional input of alarm detection 340. The alarm detection may optionally include a location 342 of a suspected defect, also termed a center-of-gravity 342 of the suspected defect.

In some examples a smaller reference image 344 and a smaller current image 346 are taken from the reference image 302 and the current image 304 around the center-of-gravity 342. Taking smaller images which nevertheless include an area which includes the image of the defect can potentially reduce computational load of subsequent operations, and/or potentially enable faster processing.

In some examples a smaller Diff image 348 is produced by subtracting one of the smaller reference image 344 and the smaller current image 346 from the other. The smaller Diff image 348 may optionally be calculated similarly to the description above with reference to FIG. 3A.

The smaller Diff image 348 has SVD performed upon it (350), as described above, producing three matrices USV*, where S is an mxn rectangular diagonal matrix with non-negative real numbers on the diagonal and zero elsewhere, and values Si of the diagonal of S are in descending order.

A Reconstructed-Diff image (354) is reconstructed (352) from US'V*, where S' is the matrix S where k higher valued diagonal term Si are kept, and the rest are made zero.

In some examples the reconstructed Diff image (354) may optionally be multiplied by a factor (356), which may potentially emphasize the defect and/or improve the SNR of the defect within the reconstructed Diff image (354). The factor may be passed as a parameter to a function performing the multiplication, and/or may be calculated based on singular values in the matrix S or based on values in the reconstructed Diff image (354).

In some examples the reconstructed Diff image (354), or the emphasized Diff image 356 may optionally be merged with the smaller reference image 344, producing a reconstructed smaller current image 358.

It is noted that the process for producing the reconstructed smaller image 358 may be termed a defect emphasizing process, as the reconstructed Diff image (354) or the emphasized Diff image 356 are added to the smaller reference image 344, thus producing an image where the defect is presented clean of noise and/or even emphasized relative to the smaller reference image 344.

In some examples the reconstructed smaller current image (358) may be merged with the reference image 302 to produce a reconstructed full size current image.

It is noted that the process for producing the reconstructed full size current image 360 may be termed a defect emphasizing process, as the reconstructed smaller current image (358) includes the reconstructed Diff image 354 added to the reference image 302 or to the current image 304, thus producing an image where the defect is presented clean of noise and/or even emphasized relative to the reference image 302 of the current image 304.

Reference is now made to FIGS. 4A and 4B, which are illustrative examples of scatter plots of a population of defects in two-dimensions based on two qualitative parameter values of the defects along two axes according to an example.

FIGS. 4A and 4B show a beneficial effect of using the SVD methods described herein on automatic classification of defect types. FIGS. 4A and 4B show results of automatic classification.

FIGS. 4A and 4B have X-axes 402 of qualitative values of a first parameter and Y-axes 404 of qualitative values of a second parameter.

FIGS. 4A and 4B show 8 defect clusters numbered 0-7, as shown in legends 406.

FIG. 4A shows a first scatter plot of a population of defects in two-dimensions based on parameter values of the defects along the two axes 402 404 as detected based on measuring the parameter values of the defects as measured in Diff images not using the SVD methods described herein.

FIG. 4B shows a second scatter plot of a population of the same defects as shown in FIG. 4A, in the same two-dimensions based on parameter values of the defects along the two axes 402 404 as detected based on measuring the parameter values of the defects as measured in Diff images where defect SNR was improved using the SVD methods described herein.

FIG. 4A shows an area 410A which includes a mix of defects from defect cluster number 5 and defect cluster numbers 2 and 3.

FIG. 4B shows the same group of defects from cluster number 5 appearing in a different area 410B of the scatter plot, apparently based on improved SNR and improved measurement of the parameters of the defects. The different area 410B includes mostly defects from cluster number 5, with much less defects from other clusters, demonstrated an improved ability to classify defects, apparently based on the improved SNR of the defect images.

One measure of ability to classify defects, or classification accuracy, compares using an attribute classifier to separate populations of different defect types on unprocessed images and using the attribute classifier on the same images after processing with the method for increasing SNR of a suspected defect described herein.

In the illustrative example of FIGS. 4A and 4B, classification accuracy was approximately 65% on the unprocessed images, and was approximately 80% on the processed images.

Reference is now made to FIGS. 5A and 5B, which are graphs of duration for producing an improved SNR image according to an example.

FIGS. 5A and 5B show a beneficial effect of optionally using the SVD methods described herein on small images.

The graphs of FIGS. 5A and 5B have X-axes 502 of runtime, that is duration, in units of milliseconds [ms], required for producing an improved SNR image as described herein, and Y-axes 504 showing qualitative density. The graphs show a statistical analysis of 500 input image pairs (current and reference) sized 128×128 pixels undergoing the above-mentioned production of an improved SNR image.

FIG. 5A shows a distribution line 506A of runtime centered around approximately 33 milliseconds, when the full sized 128×128 pixel images were used.

FIG. 5B shows a distribution line 506B of runtime centered around approximately 6.5 milliseconds, when a smaller window sized 32×32 pixels which includes the defect is used.

It is further noted, regarding using a smaller window, that the smaller window potentially includes less background to a defect image, which may be termed focusing on the defect. Producing a reconstructed Diff image and/or a reconstructed Current image has enabled better automatic classification of the defects. In the example of FIGS. 5A and 5B, some defect clusters which were in a "not able to separate" status went to "able to separate status", and a measure of precision of the cluster separation went from below 30% to above 70%.

Example 1

A method for increasing Signal-to-Noise-Ratio (SNR) of defect detection in inspection of wafers or masks, the method including:

- receiving a current image,
- receiving a reference image,
- receiving an indication for existence of a defect in the current image,
- producing a difference image between the current image and the reference image,
- performing singular value decomposition (SVD) on the difference image,
- removing one or more lower-valued singular values from a diagonal middle matrix produced by the SVD, thereby producing a reduced middle matrix, and
- producing an improved-SNR difference image by reconstructing the difference image using the reduced middle matrix.

Example 2

The method of example 1 and further including producing an improved-SNR current image by merging the improved-SNR difference image with the reference image.

Example 3

The method of example 2 wherein the improved-SNR difference image is multiplied by a factor larger than 1 before merging, thereby emphasizing the defect within the improved-SNR current image.

Example 4

The method of example 1 wherein the indication for existence of a defect in the current image includes a location within the current image where the defect is suspected to exist, and further including selecting a partial window within the current image which includes the suspected location of the defect, selecting a partial window within the reference image corresponding to the partial window of the current image, and producing the difference image between the partial window of the current image and the partial window of the reference image.

Example 5

The method of example 4 wherein a size of the partial windows is selected to include all of an area of a suspected defect.

Example 6

The method of example 4 wherein a size of the partial windows is selected to include less than all of an area of a suspected defect.

Example 7

The method of example 1 wherein the removing one or more lower-valued singular values from the diagonal middle matrix produced by the SVD, includes removing all but k of the higher-valued singular values from the diagonal middle matrix produced by the SVD, where $k>0$.

Example 8

A non-transitory computer-readable medium storing instructions that, when executed by a processor, cause the processor to perform operations including:

- receiving a current image,
- receiving a reference image,
- receiving an indication for existence of a defect in the current image, and
- producing a difference image between the current image and the reference image,
- characterized by:
- performing singular value decomposition (SVD) on the difference image,
- removing one or more lower-valued singular values from a diagonal middle matrix produced by the SVD, thereby producing a reduced middle matrix, and
- producing an improved-SNR difference image by reconstructing the difference image using the reduced middle matrix.

As such, those skilled in the art to which the present invention pertains, can appreciate that while the present invention has been described in terms of preferred examples, the concept upon which this disclosure is based may readily be utilized as a basis for the designing of other structures, systems and processes for carrying out the several purposes of the present invention.

The various illustrative logical blocks, modules, and algorithm steps described in connection with the examples disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing any departure from the scope of the disclosure.

It will also be understood that the system according to the present disclosure may be, at least partly, implemented on a suitably programmed computer. Likewise, the present disclosure contemplates a computer program being readable by a computer for executing the method of the invention. The present disclosure further contemplates a non-transitory computer-readable memory tangibly embodying a program of instructions executable by the computer for executing the method of the present disclosure.

Also, it is to be understood that the phraseology and terminology employed herein are for the purpose of description and should not be regarded as limiting.

It should be noted that the words "comprising", "including" and "having" as used throughout the appended claims are to be interpreted to mean "including but not limited to". The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases, and disjunctively present in other cases.

It is important, therefore, that the scope of the invention is not construed as being limited by the illustrative examples set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

It is expected that during the life of a patent maturing from this application other relevant imaging modalities may be developed and the scope of the term image is intended to include all such new technologies a priori.

As used herein with reference to quantity or value, the term "approximately" means "within ±25% of".

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Unless otherwise indicated, numbers used herein and any number ranges based thereon are approximations within the accuracy of reasonable measurement and rounding errors as understood by persons skilled in the art It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for increasing Signal-to-Noise-Ratio (SNR) of defect detection in inspection of wafers or masks, the method comprising:

receiving a current image;

receiving a reference image;

receiving an indication for existence of a defect in the current image;

producing a difference image between the current image and the reference image;

performing singular value decomposition (SVD) on the difference image to obtain matrices U, S and V*, wherein U is a unitary matrix, S is a rectangular diagonal matrix having singular values along a diagonal thereof, and V* is a conjugate transpose of a unitary matrix V;

removing one or more lower-valued singular values from diagonal entries of S, thereby producing a reduced middle matrix S'; and producing an improved-SNR difference image by reconstructing the difference image using U, S' and V*.

2. The method of claim 1 and further comprising producing an improved-SNR current image by merging the improved-SNR difference image with the reference image after reconstructing the difference image using U, S' and V*.

3. The method of claim 2 wherein the improved-SNR difference image reconstructed using U, S' and V* is multiplied by a factor larger than 1 before merging, thereby emphasizing the defect within the improved-SNR current image.

4. The method of claim 1 wherein:

the indication for existence of a defect in the current image comprises a location within the current image where the defect is suspected to exist;

and further comprising:

selecting a partial window within the current image which includes the suspected location of the defect;

selecting a partial window within the reference image corresponding to the partial window of the current image; and producing the difference image between the partial window of the current image and the partial window of the reference image;

wherein the singular value decomposition (SVD) is performed on the difference image of the partial window to obtain matrices U, S and V*, and one or more lower-valued singular values are removed from diagonal entries of S.

5. The method of claim 4 wherein a size of the partial windows is selected to include all of an area of a suspected defect prior to performing the singular value decomposition (SVD).

6. The method of claim 4 wherein a size of the partial windows is selected to include less than all of an area of a suspected defect prior to performing the singular value decomposition (SVD).

7. The method of claim 1 wherein the removing one or more lower-valued singular values from the diagonal entries of S, comprises removing all but k of the higher-valued singular values from diagonal entries of matrix S, where k>0.

8. A non-transitory computer-readable medium storing instructions that, when executed by a processor, cause the processor to perform operations comprising:

receiving a current image;

receiving a reference image;

receiving an indication for existence of a defect in the current image; and producing a difference image between the current image and the reference image;

characterized by:

performing singular value decomposition (SVD) on the difference image to obtain matrices U, S and V*, wherein U is a unitary matrix, S is a rectangular diagonal matrix having singular values along a diagonal thereof, and V* is a conjugate transpose of a unitary matrix V;

removing one or more lower-valued singular values from diagonal entries of S, thereby producing a reduced middle matrix S'; and producing an improved-SNR difference image by reconstructing the difference image using U, S' and V*.

* * * * *